US008583678B2

(12) United States Patent
Vainer et al.

(10) Patent No.: US 8,583,678 B2
(45) Date of Patent: Nov. 12, 2013

(54) GRAPHICAL EXPLORATION OF A DATABASE

(75) Inventors: Vitaly Vainer, Kfar Saba (IL); Yahali Sherman, Tel Aviv (IL); Doron Lehmann, Kfar Vradim (IL); Eran Nelinger, Kfar Yona (IL)

(73) Assignee: SAP Portals Israel Ltd, Ra'anana (IL)

( * ) Notice: Subject to any disclaimer, the term of this patent is extended or adjusted under 35 U.S.C. 154(b) by 0 days.

(21) Appl. No.: 13/300,762

(22) Filed: Nov. 21, 2011

(65) Prior Publication Data

US 2013/0132420 A1 May 23, 2013

(51) Int. Cl.
*G06F 17/30* (2006.01)

(52) U.S. Cl.
USPC ............ 707/769; 707/778; 707/797; 707/798

(58) Field of Classification Search
USPC .................... 707/769, 778, 797, 798
See application file for complete search history.

(56) References Cited

U.S. PATENT DOCUMENTS

| | | | | |
|---|---|---|---|---|
| 7,461,077 B1 * | 12/2008 | Greenwood | ........................... | 1/1 |
| 7,904,446 B1 * | 3/2011 | Srivastava | ..................... | 707/716 |
| 8,069,188 B2 * | 11/2011 | Larson et al. | ................. | 707/802 |
| 8,122,023 B2 * | 2/2012 | Lewak et al. | ................. | 707/736 |
| 8,140,559 B2 * | 3/2012 | Bobick et al. | ................. | 707/761 |
| 8,150,885 B2 * | 4/2012 | Keith, Jr. | ......................... | 707/797 |
| 8,225,233 B2 * | 7/2012 | Kashik et al. | ................. | 715/848 |
| 8,312,020 B2 * | 11/2012 | Herrnstadt | ..................... | 707/737 |
| 2002/0004793 A1 * | 1/2002 | Keith, Jr. | ........................... | 707/1 |
| 2003/0041055 A1 * | 2/2003 | Nakamura et al. | ................ | 707/3 |
| 2003/0074375 A1 * | 4/2003 | Nakamura et al. | ............ | 707/200 |
| 2003/0115207 A1 * | 6/2003 | Bowman et al. | .............. | 707/100 |
| 2003/0126235 A1 * | 7/2003 | Chandrasekar et al. | ...... | 709/220 |
| 2004/0117393 A1 * | 6/2004 | DeMesa et al. | ............... | 707/100 |
| 2006/0265364 A1 * | 11/2006 | Keith, Jr. | ........................... | 707/3 |
| 2007/0005566 A1 * | 1/2007 | Bobick et al. | ..................... | 707/2 |
| 2010/0324952 A1 * | 12/2010 | Bastos et al. | ....................... | 705/7 |
| 2011/0282704 A1 * | 11/2011 | Graeber et al. | ............. | 705/7.11 |
| 2011/0320439 A1 * | 12/2011 | Gruschko et al. | ............. | 707/722 |
| 2012/0005239 A1 * | 1/2012 | Nevin, III | ..................... | 707/798 |
| 2012/0011474 A1 * | 1/2012 | Kashik et al. | ................. | 715/848 |
| 2012/0030245 A1 * | 2/2012 | Herrnstadt | ..................... | 707/798 |
| 2012/0162265 A1 * | 6/2012 | Heinrich et al. | ............. | 345/661 |
| 2012/0265728 A1 * | 10/2012 | Plattner et al. | ................ | 707/607 |

* cited by examiner

*Primary Examiner* — Thanh-Ha Dang
(74) *Attorney, Agent, or Firm* — Fish & Richardson P.C.

(57) ABSTRACT

Techniques implemented in methods, computer-readable media apparatus, and systems for graphically exploring an in-memory database include: identifying a selected data object; searching an in-memory database for a data element associated with a search term; and determining a relationship between the data element and the selected data object; and generating a displayable graph of the relationship as a path between the data element and the selected data object, the path comprising at least two nodes, where a first node represents the selected data object and a second node represents a node associated with the data element.

26 Claims, 11 Drawing Sheets

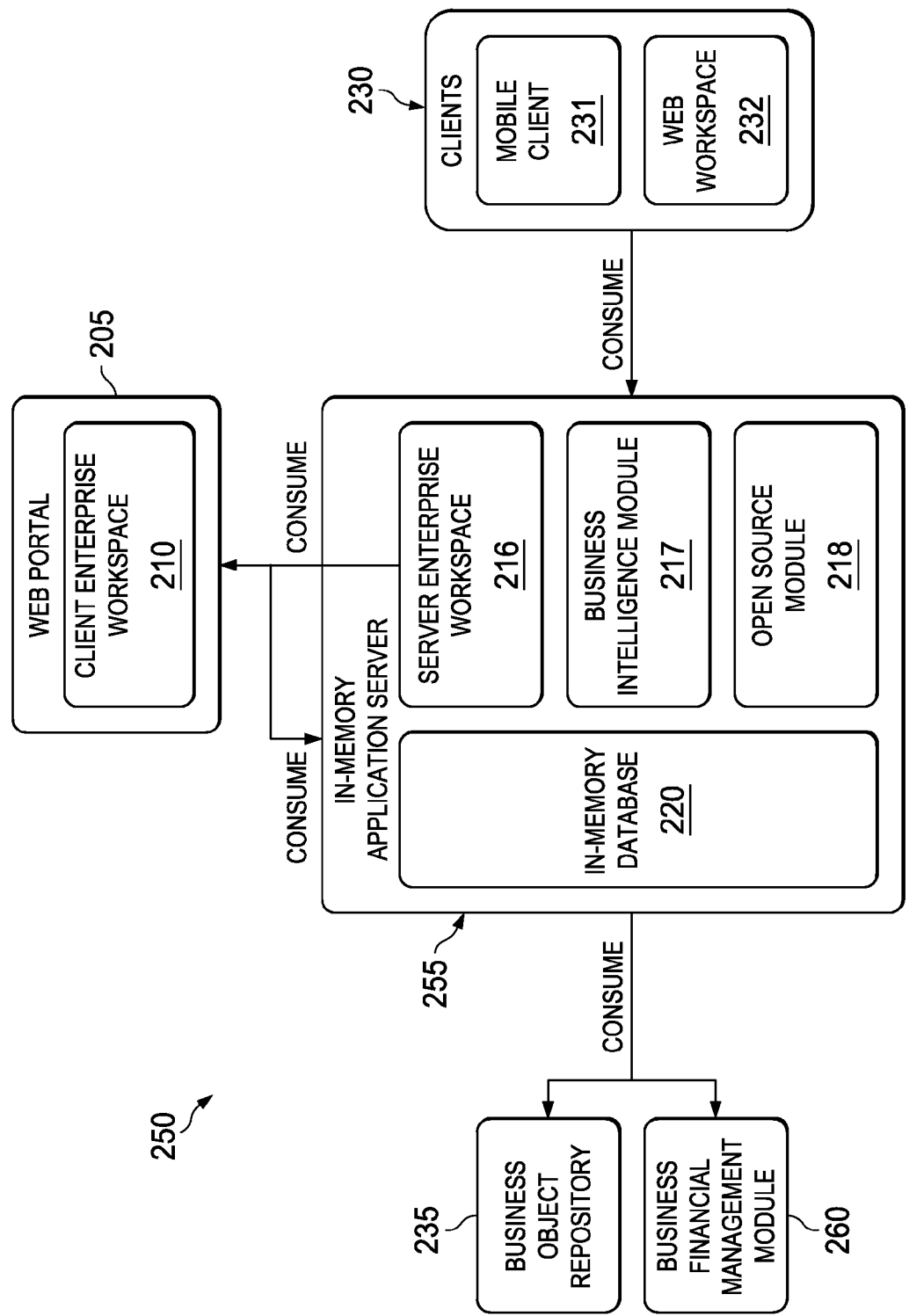

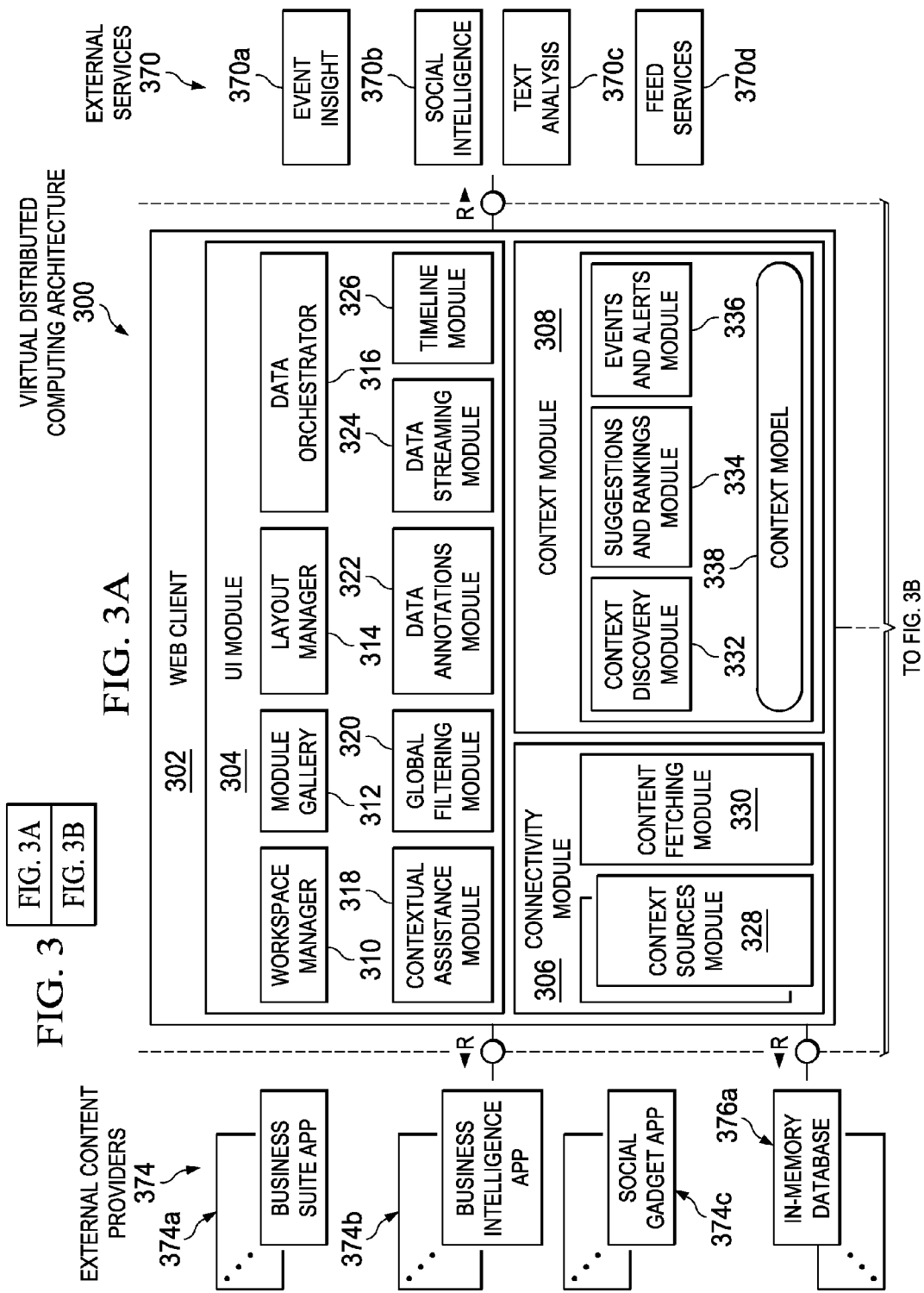

600

*LastResult = X;*

*While (not(LastResult.getNextEdge().getNextVertice()) == A)*
*{*
    *NextCube = LastResult.getNextEdge().getNextVertice();*
    *RelationForJoin = LastResult.getNextEdge();*
    *NextRelation = NextCube.getNextEdge();*

*SELECT LastResult.x', NextCube.NextRelation AS TempResult*
    *FROM LastResult JOIN NextCube*
    *ON LastResult.RelationForJoin = NextCube.RelationForJoin;*

*LastResult = TempResult;*
    *LastResults.setNextEdge(NextCube.getNextEdge());*
*}*

*RelationForJoin = LastResult.getNextEdge();*

*SELECT LastResult.x', A.\* AS FinalResults*
*FROM LastResult JOIN A*
*ON LastResult.RelationForJoin = A.RelationForJoin;*

*Return FinalResults;*

FIG. 6

GRAPHICAL EXPLORATION OF A DATABASE

TECHNICAL BACKGROUND

This disclosure relates to providing graphical exploration of a database, such as an in-memory database.

BACKGROUND

Business users of software in a business enterprise may utilize a virtual workspace to browse, view, modify, and/or otherwise manipulate data related to the business enterprise. Such data may include a variety of information in many different forms, such as sales data, revenue data, human resources information, business hierarchy information, and otherwise. Graphs, tables, charts, electronic communications, web services, reports, and other forms of data, may be viewable in the user's workspace. The workspace may allow or facilitate the resolution of business issues and/or problems by the user. The business data may be presented to a user in a particular view, or data cube, allowing the user to analyze the business data with respect to different contexts, such as a particular business issue, a product or service, an organizational unit, or other relevant contexts. Each data cube may be defined at design time prior to analysis of a data cube by a user. Further, defining a particular data cube may require knowledge of the underlying structure of business data to be represented in the data cube and the dimensions of the data cube that are to be joined.

SUMMARY

One general embodiment according to the present disclosure includes techniques implemented in methods, computer-readable media apparatus, and systems for graphically exploring an in-memory database include: identifying a selected data object; searching an in-memory database for a data element associated with a search term; and determining a relationship between the data element and the selected data object; and generating a displayable graph of the relationship as a path between the data element and the selected data object, the path comprising at least two nodes, where a first node represents the selected data object and a second node represents a node associated with the data element.

A first aspect combinable with the general embodiment includes receiving a selection of a particular node on the path; and generating a new data object based on the selection.

In a second aspect combinable with any of the previous aspects, the new data object includes a view of data in the in-memory database different from a view associated with the selected data object.

In a third aspect combinable with any of the previous aspects, the new data object includes the particular node on the path.

In a fourth aspect combinable with any of the previous aspects, a plurality of data objects associated with the search term are identified in response to searching the in-memory database.

In a fifth aspect combinable with any of the previous aspects, a plurality of relationships are determined between the selected data object and the plurality of data objects.

In a sixth aspect combinable with any of the previous aspects, each of the plurality of relationships is displayed in at least one of a plurality of paths, each of the plurality of paths sharing the selected data object as a common node.

In a seventh aspect combinable with any of the previous aspects, the search term is not associated with a dimension of the selected data object.

In an eighth aspect combinable with any of the previous aspects, the at least one path further includes a third node representing an intervening node between the first and second nodes.

In a ninth aspect combinable with any of the previous aspects, the third node represents a data object associated with the data element, and the data object is different from the selected data object.

In a tenth aspect combinable with any of the previous aspects, the selected data object is a data cube.

Various embodiments of providing graphical exploration of an in-memory database according to the present disclosure may have one or more of the following features. For example, the displayed paths representing relationships between a selected data cube and data objects returned in a search of an in-memory database may allow a user to identify particular nodes or data to include in a new data cube. Accordingly, a selection of a particular node on the path is received, and a new data cube is generated based on the selection. The new data cube may include a view of data in the in-memory database different from a view associated with the selected data cube. The new data cube may also include the particular node on the path. Searching the in-memory database may return a plurality of data objects associated with the search term. A plurality of relationships may be determined between the selected data cube and the plurality of data objects, wherein each of the plurality of relationships is displayed in at least one of a plurality of paths, each of the plurality of paths sharing the selected data cube as a common node. Further, the search term may not be associated with a dimension of the selected data cube. The at least one path further includes a third node representing an intervening node between the first and second nodes. The third node represents a data object associated with the data element, the data object different from the selected data object.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DESCRIPTION OF DRAWINGS

FIGS. 2A-2B illustrate additional example distributed computing systems operable to generate, view, modify, and/or otherwise provide graphical exploration of an in-memory database;

FIG. 6 illustrates an example algorithm 600 for calculating a new data cube based on a predefined dimension.

DETAILED DESCRIPTION

Figure 1:
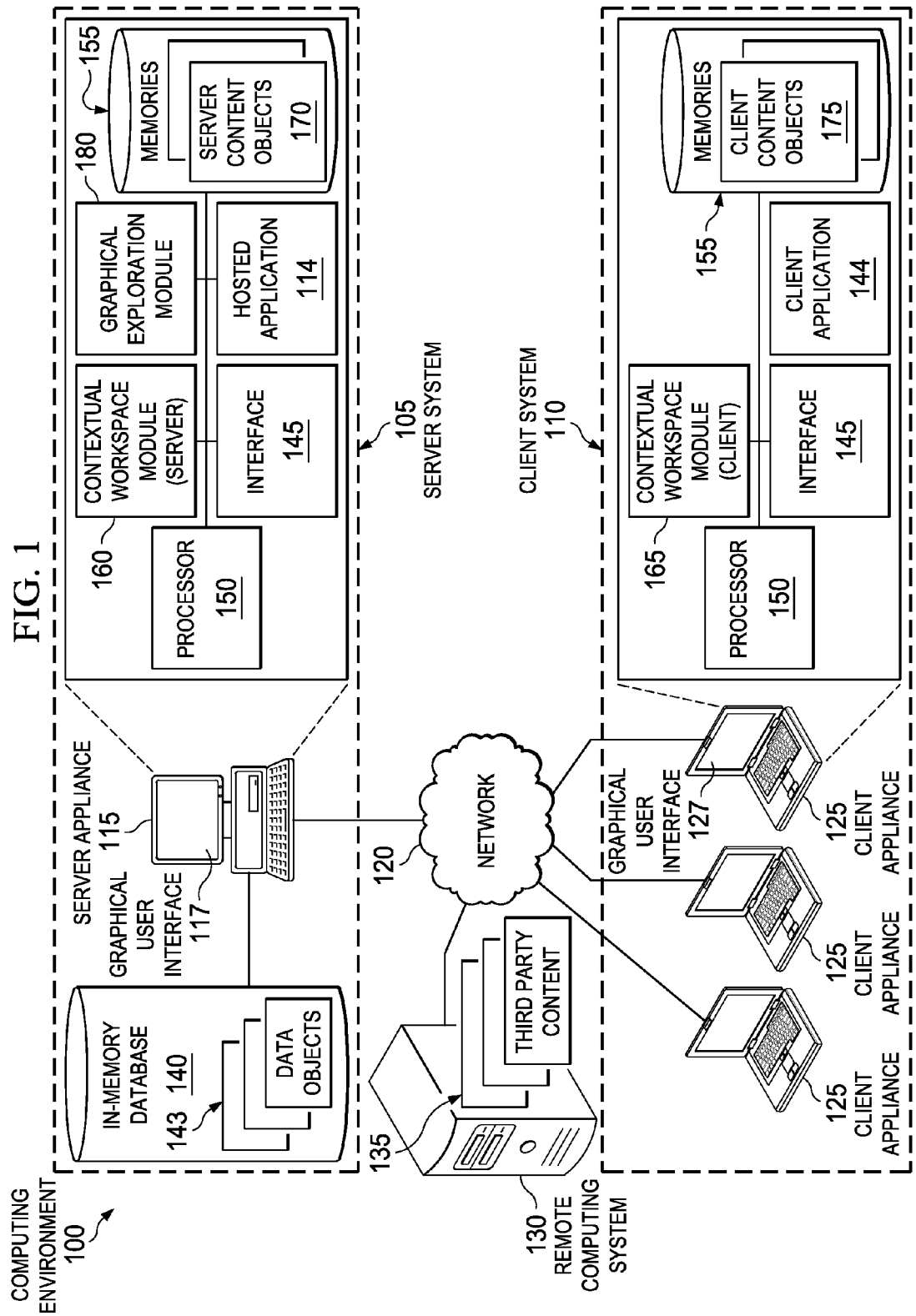
FIG. 1 illustrates an example distributed computing system operable to provide graphical exploration of an in-memory database.

FIG. 1 illustrates an example distributed computing system 100 operable to facilitate graphical exploration of an in-memory database. Data objects in the in-memory database may be comprised of business data represented in a particular view, or data cube. Alternatively, the business data may be stored in and/or referenced by other data objects, such as, for example, relational databases, reports, documents, tables, and other objects or repositories. Although the examples below describe interaction with data cubes, other types of data objects are also within the scope of the present disclosure. The data cube represents a data object defining a predefined or pre-calculated view on business data. Accordingly, the data cube can be referred to as a calculated view. As explained more fully below, the business data may be presented to the user in any of a variety of techniques and views, such as, for example, reports, tables, notes, graphs, and other views. The business data may be connected and/or related according to any of a variety of contexts, such as, for example, a particular business issue or problem, a particular product or service, a particular organizational unit and/or portion of a business enterprise, across a particular position and/or user role found within the business enterprise, and other contexts.

Typically, data cubes are defined during design time, prior to execution of queries for business data associated with the data cubes. Graphical exploration of an in-memory database, however, may allow creation of new data cubes in real-time in addition to the predefined data cubes. The new data cubes may be created based on generating a data structure graph of the underlying business data and allowing selection of specific data cubes or nodes in the data structure graph. Queries may be executed on data in an in-memory database. The search results may return data objects associated with other data cubes or nodes. The other data cubes and nodes are linked to an initial data cube, and the relationship between data cubes may be represented in the data structure graph. A user may then select specific data objects, data cubes, or nodes to be included in a new data cube. In some instances, technical experts are not needed to define the new data cubes, as is usually required for a traditional online analytical processing (OLAP) system.

The illustrated computing environment 100 includes a server system 105, a client system 110, and a remote computing system 130 communicably coupled through a network 120. Although illustrated as single systems, each of the systems 105, 110, and 130 may include more than one system and/or more than one computing device (e.g., computer, laptop, server, mobile device, and otherwise) within a distributed computing environment. In general, computing environment 100 depicts an example configuration of a system capable of providing stateful execution of stateless applications in a substantially transparent way, as well as dynamically determining the particular application's mode of operation in response to requests from its clients (e.g., client appliances 125).

The illustrated server system 105 includes one or more server appliances 115 having corresponding graphical user interfaces (GUIs) 117. In general, the server appliance 115 is a server that stores one or more applications, where at least a portion of the applications are executed via requests and responses sent to users or clients within and communicably coupled to the illustrated environment 100 of FIG. 1. In some instances, the server appliance 115 may store a plurality of various hosted applications, while in other instances, the server appliance 115 may be a dedicated server meant to store and execute only a single hosted application (e.g., the contextual workspace (server) 160 or the graphical exploration module 180). In some instances, the server appliance 115 may comprise a web server, where the applications, such as the graphical exploration module 180, represent one or more web-based applications accessed and executed via network 120 by the client appliances 125 of the environment 100 to perform the programmed tasks or operations of the hosted applications.

At a high level, the server appliance 115 comprises an electronic computing device operable to receive, transmit, process, store, or manage data and information associated with the environment 100. Specifically, the server appliance 115 illustrated in FIG. 1 is responsible for receiving application requests from one or more applications (e.g., associated with the clients 125 of environment 100) and responding to the received requests by processing said requests in the associated hosted application 114, and sending the appropriate response from the hosted application 114 back to the requesting client application 144. In addition to requests from the external clients 125 illustrated in FIG. 1, requests associated with the hosted applications 114 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server appliance 115, environment 100 can be implemented using two or more server appliances 115, as well as computers other than servers, including a server pool. Indeed, server appliance 115 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server appliance 115 may be adapted to execute any operating system, including Linux, UNIX, Windows, Mac OS, or any other suitable operating system.

The illustrated server appliance 115 is communicably coupled with in-memory database 140 in the server system 105. In some embodiments, server 115 and/or certain of its components may be integrated with database 140 so that, for instance, processing (e.g., all or partial) may be performed directly on in-memory data with processing results passed (e.g., via a communication channel) directly to a client. In alternative embodiments, the in-memory database 140 may be located external to the server system 105 and communicably coupled to one or more of the server system 105 and/or client system 110 through the network 120. The illustrated in-memory database 140 may include integrated processing, i.e., all business and/or analytic operations done in processing memory. Moreover, content from business content sources (described more fully below) may be replicated from one or more transactional systems (e.g., coupled to the network 120) to the in-memory database 140 immediately. Thus, the in-memory database 140, in some aspects, may handle the analytical systems for all business data in real-time, as opposed to, for instance, computational processing systems that have separate transactional and analytical systems that connect through relational databases (i.e., relational databases stored on magnetic memory that require a process, e.g., ETL, to transfer data from one system to another not in real time but with a delay of an hour, day, week, or longer).

In some embodiments, the in-memory database 140 may expose business data and capabilities to improve an end-solution for end users (e.g., the client appliances 125). The in-memory database 140 may reside on top of a computational engine (e.g., in the server appliance 115 or otherwise) that facilitates fast manipulations on large amounts of business data and/or replication of entire business suite information. Thus, in some embodiments, the in-memory database may provide for the following design principles/concepts: business data in real-time (e.g., GUI patterns for constantly updated business data); well modeled tables and data cubes (e.g., in order to provide semantic services); a highly parallelized computational engine (e.g., for computationally intensive GUI patterns such as real time alerts and/or suggestions); close coupling of business logic and business data (e.g., eliminating indexing and caching).

The illustrated in-memory database 140 stores one or more data objects 143. The data objects 143 may include and/or reference a variety of objects that store and/or include business data. For instance, the data objects 143 may be data cubes, such as OLAP (online analytical processing) cubes. The data cubes may consist of a data structure that allows for columnar data storage rather than, e.g., row data storage; different types of indices compared to relational databases; and in-memory technology as compared to data stored in relational databases. The data cube may also allow manipulation and/or analysis of the data stored in the cube from multiple perspectives, e.g., by dimensions, measures, and/or elements of the cube. A cube dimension defines a category of data stored in the cube, for example, a time duration of certain business data, a product or service, business user roles, and a variety of other categories. In other words, a cube dimension may be one way to slice business data stored in the cube according to some business logic (e.g., logic within and/or associated with the contextual workspace modules). In some instances, the data cube may have three-dimensions, but any number of dimensions may be designed into the cube (e.g., a hypercube).

A cube measure may be a fact, such as a numeric fact, that is categorized into one or more dimensions. Measures may include, for example, specific product sales data according to a set period of time. Measures may also include, for example, manufacturing efficiency data for a particular organizational unit of a business enterprise. In short, measures may include any appropriate business data that may be manipulated according to business logic to assist or support the business enterprise.

One or more functions may be performed on a data cube. For instance, the data cube may be pivoted, in various ways. Each pivot provides the business user with a distinct view of particular business data stored in the cube. For instance, in one view, a business user may be presented with sales data of a specific data within a particular geographic region across a particular time period with a particular focus on the sales vs. geography relationship. In another view, the same data (e.g., the same measures and elements) may be presented with a different focus, e.g., the sales vs. time period relationship. In some aspects, pivoting a data cube in real-time may allow the business user to more efficiently analyze the business data.

Other functions performable on data cubes may be, for instance, slice, dice, drill down/up, and roll-up. A slice operation identifies a subset of a multi-dimensional array corresponding to a single value for one or more members of the cube dimensions not in the subset. A dice operation is a slice operation on more than two dimensions of a data cube (or more than two consecutive slices). A drill down/up operation allows the business user to navigate the data cube's levels of data to reveal levels containing the most summarized (up) data to the most detailed (down) data. A roll-up operation involves computing all of the data relationships for one or more dimensions of the data cube.

The data objects 143 may include and/or store other forms of data along with or in place of data cubes. For example, the data objects 143 may represent, store, and/or reference data from one or more content sources, such as web content, feeds, REST services, business data repositories, reports, status updates, discussions, wikis, blogs, and other content sources. Of course, while illustrated as contained in the in-memory database 140, the data objects 143 may also be stored, for example, in one or both of the memories 155, in the remote computing system 130, and/or a separate repository communicably coupled to the network 120. In some embodiments, the data objects 143 may be stored in a raw, compiled, or compressed form or combination thereof.

The illustrated client system 110 includes one or more client appliances 125 having corresponding GUIs 127. Each client appliance 125 may be any computing device operable to connect to or communicate with at least the server system 105 and/or via the network 120 using a wireline or wireless connection. Further, as illustrated, each client appliance 125 includes a processor 150, an interface 145, and a memory 155. In general, each client appliance 125 comprises an electronic computer device operable to receive, transmit, process, and store any appropriate data associated with the environment 100 of FIG. 1. It will be understood that there may be any number of client appliances 125 associated with, or external to, environment 100. For example, while illustrated environment 100 illustrates three client appliances, alternative implementations of environment 100 may include a single client appliance 125 communicably coupled to the server system 105, or any other number suitable to the purposes of the environment 100.

Additionally, there may also be one or more additional client appliances 125 external to the illustrated portion of environment 100 that are capable of interacting with the environment 100 via the network 120. Further, the term "client" and "user" may be used interchangeably as appropriate without departing from the scope of this disclosure. Moreover, while each client appliance 125 is described in terms of being used by a single user, this disclosure contemplates that many users may use one computer, or that one user may use multiple computers. As used in this disclosure, client appliance 125 is intended to encompass a tablet computing device, personal computer, touch screen terminal, workstation, network computer, kiosk, wireless data port, smart phone, personal data assistant (PDA), one or more processors within these or other devices, or any other suitable processing device. For example, each client appliance 125 may comprise a computer that includes an input device, such as a keypad, touch screen, mouse, or other device that can accept user information, and an output device that conveys information associated with the operation of the server system 105 or the client appliance 125 itself, including digital data, visual information, any application, or the GUI 127. Both the input and output device may include fixed or removable storage media such as a magnetic storage media, CD-ROM, or other suitable media to both receive input from and provide output to users of the client appliances 125 through the display, namely, the GUI 127.

The illustrated network 120 facilitates wireless or wireline communications between the components of the environment 100 (i.e., between the server system 105 and the client system 110), as well as with any other local or remote computer (e.g., remote computing system 130), such as additional clients, servers, or other devices communicably coupled to network 120 but not illustrated in FIG. 1. The network 120 is illustrated as a single network in FIG. 1, but may be a continuous or discontinuous network without departing from the scope of this disclosure, so long as at least a portion of the network 120 may facilitate communications between senders and recipients. The network 120 may be all or a portion of an enterprise or secured network, while in another instance at least a portion of the network 120 may represent a connection to the Internet. In some instances, a portion of the network 120 may be a virtual private network (VPN), such as, for example, the connection between the client system 110 and the server system 105.

Further, all or a portion of the network 120 can comprise either a wireline or wireless link. Example wireless links may include 802.11a/b/g/n, 802.20, WiMax, and/or any other appropriate wireless link. In other words, the network 120 encompasses any internal or external network, networks, subnetwork, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), cellular networks, all or a portion of the Internet, and/or any other communication system or systems at one or more locations.

The illustrated remote computing system 130 is communicably coupled to one or both of the server system 105 and client system 110 through the network 120. In some instances, as illustrated, the remote computing system 130 stores and/or references third party content 135, such as, for example, data objects, web content, electronic communications, content feeds, and other data sources. Although illustrated as a single appliance, the remote computing system 130 may include any number of appliances (e.g., servers, clients, mobile devices, and otherwise) coupled to the network 120 individually and/or in groups. For instance, in some embodiments, the remote computing system 130 may be a web content server delivering web content to one or more of the client appliances 125 in response to a request. In some embodiments, the remote computing system 130 may be a repository storing one or more data objects, such as data cubes or other form of database storing business data.

The illustrated communication interfaces 145 (shown as part of the server appliance 115 and the client appliance 125) facilitate communication among appliances in, for example, the client system 110, the remote computing system 130, and the server system 105. The interfaces 145 may also facilitate communication among the illustrated systems and other systems in a client-server or other distributed environment (including within environment 100) connected to the network. Generally, the interfaces 145 include logic encoded in software and/or hardware in a suitable combination and operable to communicate with the network 120. More specifically, the interfaces 145 may include software supporting one or more communication protocols associated with communications such that the network 120 or interface's hardware is operable to communicate physical signals within and outside of the illustrated environment 100.

The illustrated processors 150 (shown as part of the server appliance 115 and the client appliance 125) may be a central processing unit (CPU), a blade, an application specific integrated circuit (ASIC), a field-programmable gate array (FPGA), or another suitable component. Generally, the processors 150 execute instructions and manipulate data to perform the operations of the respective server appliance 115 and client appliance 125 and, specifically, the contextual workspace module (server) 160 and, contextual workspace module (client) 165), and the graphical exploration module 180, as well as any other applications. Specifically, the server appliance's processor 150 executes the functionality required to receive and respond to requests from the client appliances 125 and their respective applications (e.g., contextual workspace (client) 165), as well as the functionality required to perform the other operations of the contextual workspace module (server) 160.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of submodules, third party services, components, libraries, and such, as appropriate. Conversely, the features and functionality of various components can be combined into single components as appropriate. Although illustrated as a single processor 150 for each of the respective server appliance 115 and client appliance 125 in FIG. 1, two or more processors may be used according to particular needs, desires, or particular embodiments of environment 100.

The illustrated memories 155 (shown as part of the server appliance 115 and the client appliance 125) may include any memory or database module and may take the form of volatile or non-volatile memory including, without limitation, magnetic media, optical media, random access memory (RAM), read-only memory (ROM), removable media, or any other suitable local or remote memory component. Each memory 155 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective server appliance 115 and client appliance 125. Additionally, each memory 155 may include any other appropriate data, such as VPN applications, firmware logs and policies, firewall policies, a security or access log, print or other reporting files, as well as others.

As illustrated, memory 155 of the server appliance 115 includes and/or stores one or more server content objects 170. Memory 155 of the client appliance 125 includes and/or stores one or more client content objects 175. In some embodiments, the server content objects 170 and/or the client content objects 175 may be similar to the data objects 143 stored in the in-memory database 140. For example, the content objects 170 and 175 may be data cubes, tables, reports, or other content sources, such as web content, electronic communications, feeds, and otherwise. Regardless of the form of the content objects 170 and 175, these objects may contain and/or reference business data on which business logic may be applied, e.g., by the contextual workspace module (server) 160 and/or contextual workspace module (client) 165, in order to realize and/or accomplish a task in a business environment.

The illustrated computing system 100 includes a contextual workspace module (server) 160 and a contextual workspace module (client) 165, and a graphical exploration module 180. At a high level, each of the contextual workspace module (server) 160 and contextual workspace module (client) 165 (referred to collectively as the contextual workspace modules), and the graphical exploration module 180, is any application, program, module, process, or other software that may execute, change, delete, generate, or otherwise manage information according to the present disclosure, particularly in response to and in connection with one or more requests received from the illustrated client appliances 125 and their associated applications. In certain cases, only one contextual workspace module (server) 160 may be located at a particular server appliance 115. In others, a plurality of related and/or unrelated contextual workspace module (server) 160 may be stored at a single server appliance 115, or located across a plurality of other server appliances 115 in the server system 105, as well.

In certain cases, the contextual workspace modules and the graphical exploration module 180 may be implemented as composite applications. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the contextual workspace modules may represent web-based applications accessed and executed by remote client appliances 125 or client applications via the network 120 (e.g., through the Internet).

Further, while illustrated as internal to server appliance 115, one or more processes associated with the contextual workspace module (server) 160 or the graphical exploration module 180 may be stored, referenced, or executed remotely. For example, a portion of the contextual workspace module (server) 160 may be a web service associated with the application that is remotely called, while another portion of the contextual workspace module (server) 160 may be an interface object or agent bundled for processing at a remote client appliance 125 via the contextual workspace module (client) 165. Moreover, any or all of the contextual workspace modules or the graphical exploration module 180 may be a child or sub-module of another software module or enterprise application (not illustrated) without departing from the scope of this disclosure.

As explained more fully below, one, all, or a combination of the contextual workspace modules 160 and 165, and the graphical exploration module 180, may present or facilitate presentation of a user interface, e.g., through GUI 117 and/or GUI 127, to a business user to perform a variety of tasks. For instance, the contextual workspace modules 160 and 165 may present one or more workspace modules containing business data relevant to the business user in a variety of forms, e.g., tables, graphs, notes, and otherwise. The relevant business data may be sourced from, for example, the data objects 143 or other content sources. The graphical exploration module 180 may present a graphical depiction of relationships between different data cubes or specific data objects, allowing a user to select particular elements of the graphical depiction for generating new data cubes.

Figure 2A:
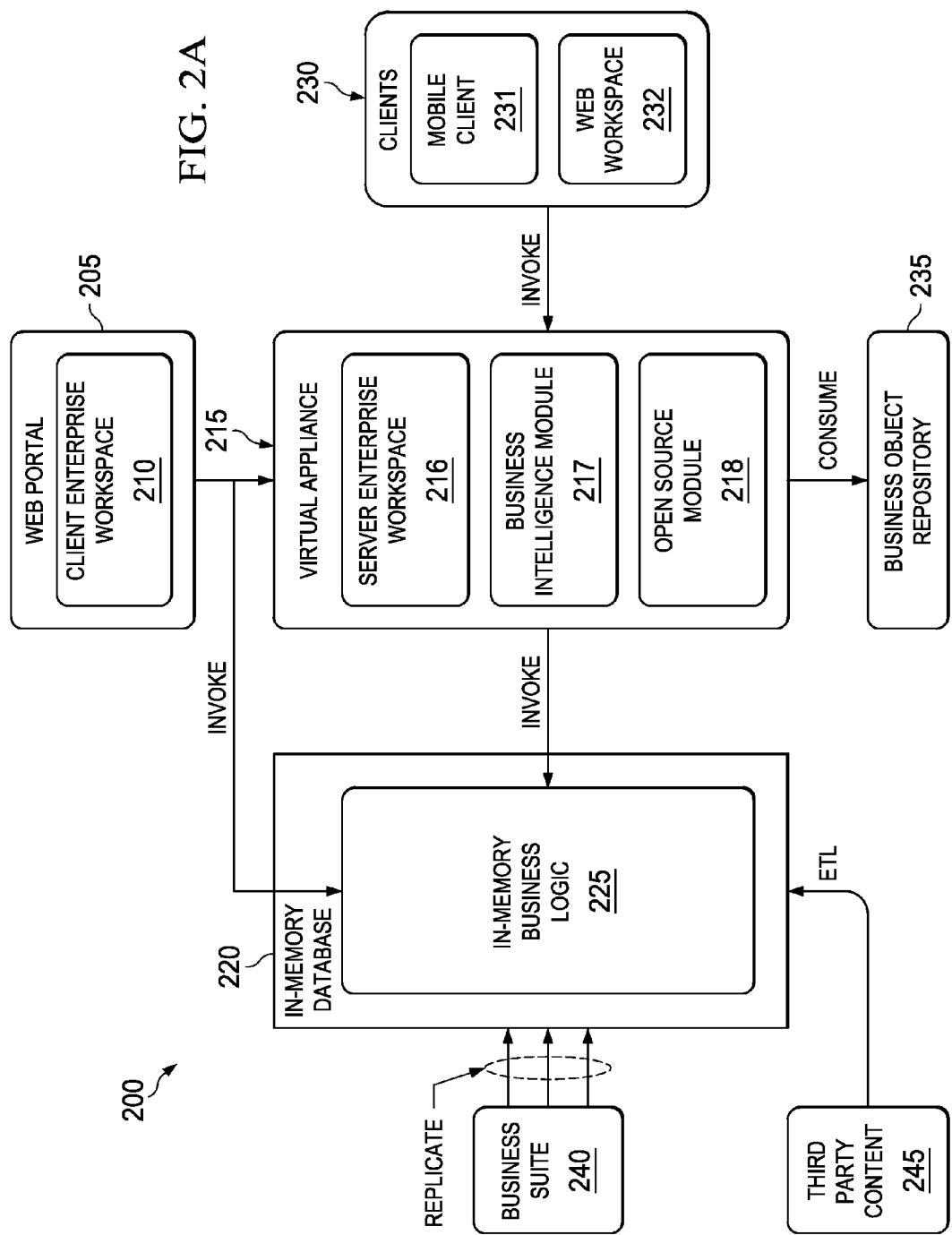

FIGS. 2A-2B illustrate additional example distributed computing systems 200 and 250, respectively, operable to generate, view, modify, and/or otherwise manipulate a contextual workspace. Distributed computing systems 200 and 250, in some embodiments, may illustrate two different example configurations for deployment of a contextual workspace within a distributed computing environment. For example, in some instances, either of the distributed computing systems 200 or 250 may represent an alternate deployment of a contextual workspace within a distributed computing environment to the computing system 100 shown in FIG. 1. The example configurations for distributed computing systems 200 and 250 can also be configured to provide for graphical exploration of an in-memory database, as described below in connection with FIGS. 4A-D and FIG. 5. In particular, user interfaces provided in a contextual workspace can be enriched with new and alternative views on business data in real-time.

Turning to FIG. 2A, the illustrated distributed computing system 200 includes a web portal 205 communicably coupled to a virtual appliance 215 and an in-memory database 220. In some embodiments, the web portal 205 provides an authentication portal allowing a single point of access to applications, business data, and services both within and external to a business enterprise. For instance, an employee or user of the business enterprise may access the virtual appliance 215 and/or the in-memory database 220 via the web portal 205. In other words, the web portal 205 may provide a front end accessible through a client appliance located at the business enterprise.

The illustrated web portal 205 includes a client enterprise workspace 210. In some aspects, the client enterprise workspace 210 may be substantially similar to the contextual workspace module (client) 165 shown in FIG. 1. For instance, the client enterprise workspace 210 may present or facilitate presentation of a user interface (e.g., one or more workspace modules described more fully below) to the business user to perform a variety of tasks.

The illustrated virtual appliance 215 may be substantially similar to the server appliance 115 illustrated in FIG. 1 and include a server enterprise workspace 216, a business intelligence module 217, and an open source module 218. The server enterprise workspace 216, in some implementations, may be substantially similar to the contextual workspace module (server) 160 shown in FIG. 1. For instance, the server enterprise workspace 216 may provide for a customizable and dynamic virtual workspace accessible to a client and/or user via a GUI, e.g., through the web portal 205. In some aspects, as explained more fully below, such a virtual contextual workspace may provide for a number of functional features and advantages, such as, for instance, providing semantic context to relevant business data, providing suggestions to the user to add semantic and/or social data, and generating a number of ranked suggestions to add semantic data to the workspace according to social criteria.

The illustrated business intelligence module 217, at a high level, provides software and/or middleware services for performance analytics (e.g., supports organizational efforts to develop sophisticated visual representations of processes and performance, providing organizations with new insights that can help them make more informed decisions, assess and plan a business intelligence strategy, deploy dashboard tools, generate management and operational reports, and build an IT infrastructure that provides high scalability for users and data); services for analytic applications (e.g., provides guidance and deployment expertise in implementing analytic applications, offering pre-built analytics and data models to help a customer with a specific business problem in various industries, helping organizations to efficiently deploy applications); and introductory business intelligence services (e.g., introduces organizations to the dynamics of using business intelligence, providing the ability to leverage the functionality of business intelligence—such as executive dashboards and operational reports—without initiating a full-scale implementation).

The illustrated open source module 218, in some embodiments, may be an open source web application framework, such as, for example, a Rails (or RoR) for the Ruby programming language. In some embodiments, the module 218 may provide generic services like authentication, authorization, repository, logging, and otherwise The illustrated virtual appliance 215 is communicably coupled to a business object repository 235 in order to consume (e.g., retrieve, modify, manipulate or otherwise) business objects relevant to the business enterprise. Each business object stored on the repository 235, for example, a capsule with an internal hierarchical structure, behavior offered by its operations, and integrity constraints. In general, the overall structure of the business object model ensures the consistency of the interfaces that are derived from the business object model. The derivation helps ensure that the same business-related subject matter or concept can be represented and structured in the same way in various interfaces. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Business objects are generally semantically disjointed, i.e., the same business information is represented once. In some embodiments, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure.

A business object may be defined such that it contains multiple layers. Typical business object may contains four layers: a kernel layer, an integrity layer, an interface layer, and an access layer. The innermost layer of the example business object is the kernel layer. The kernel layer represents the business object's inherent data, containing various attributes of the defined business object. The second layer represents the integrity layer. The integrity layer contains the business logic of the object. Such logic may include business rules for consistent embedding in a computing environment and the constraints regarding the values and domains that apply to the business object. Business logic may comprise statements that define or constrain some aspect of the business, such that they are intended to assert business structure or to control or influence the behavior of the business entity. It may pertain to the facts recorded on data and constraints on changes to that data. In effect, business logic may determine what data may, or may not, be recorded in business object. The third layer, the interface layer, may supply the valid options for accessing the business object and describe the implementation, structure, and interface of the business object to the outside world. To do so, the interface layer may contain methods, input event controls, and output events. The fourth and outermost layer of the business object is the access layer. The access layer defines the technologies that may be used for external access to the business object's data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects of this embodiment may implement standard object-oriented technologies such as encapsulation, inheritance, and/or polymorphism.

The illustrated system 200 includes the in-memory database 220 communicably coupled to the web portal 205 and the virtual appliance 215. For example, as illustrated, the in-memory database 220 may be invoked by either or both of the web portal 205 and the virtual appliance 215. The in-memory database 220 may be substantially similar to the in-memory database 140 described in FIG. 1. Further, the in-memory database 220 includes in-memory business logic 225 (which, as illustrated, may be invoked by either or both of the web portal 205 and the virtual appliance 215). The in-memory business logic 225 may include a combination of one or more of software, middleware, and hardware (or other logic) operable to manipulate one or more data objects (e.g., stored in-memory on the database 220). For instance, the in-memory business logic 225 may perform functionality associated with and/or used by the enterprise workspace (client) 210 and/or enterprise workspace (server) 216, such as the methods described with reference to FIGS. 5-7 and 9, as well as other functionality disclosed herein.

The illustrated in-memory database 220 is communicably coupled to a business suite 240. In some embodiments, as described above, complete or partial processing may be done directly on a database, thus rendering making components like the "database," "server," and/or "suite" substantially similar or identical. At a high level, the business suite 240 may consist of one or more integrated enterprise applications enabling, e.g., business enterprises, to execute and optimize business and IT strategies, such as performing industry-specific, and business-support processes. In some embodiments, the business suite 240 may be built on an open, service-oriented architecture (SOA). Such integrated business applications may be replicated, for example, via the web portal 205 through the in-memory database 220, such as via the enterprise workspace (client) 210.

The illustrated in-memory database 220 is also communicably coupled to third party content 245. The third party content 245, for example, may be substantially similar to data stored and/or referenced by the remote computing system 135 described with reference to FIG. 1, such as, for example, the third party content 135. In some aspects, the third party content 245 may be stored and/or accessed through relational databases (i.e., relational databases stored on magnetic memory that require a process, e.g., ETL, to transfer data from one system to another not in real time but with a delay of an hour, day, week, or longer). For instance, while some business data may be stored on the in memory database 220 and therefore, be accessible in real-time, some business data may be available to and/or exposed by the in-memory business logic 225, such as the third party content 245.

The illustrated system 200 also includes one or more clients 230. For instance, as illustrates, the clients 230 may include a mobile client 231, and a web workspace 232. One or more of the clients 230 may invoke, for example, the enterprise workspace (server) 216, on the virtual appliance 215 in order to access and/or expose the functionality of the in-memory business logic 220. For example, the mobile client 231 may facilitate invocation of the enterprise workspace (server) 216 from a mobile device (e.g., cell phone, smart phone, email mobile device, PDA, or other mobile device). The web workspace 232 may, for instance, facilitate invocation of the enterprise workspace (server) 216 through a network connection, such as the global network known as the world wide web.

Turning to FIG. 2B, the illustrated distributed computing system 250 includes the web portal 205 communicably coupled to an in-memory application server 255, which, in turn, is communicably coupled to the clients 230, the business object repository 235, and a business financial management module 260. Accordingly, as illustrated, the distributed computing system 250 may provide for an alternative deployment configuration of a system operable to generate, view, modify, and/or otherwise manipulate a contextual workspace, as compared to the system 200, but with similar (or identical) components in some respect. For example, as illustrated, the in-memory application server 255 in system 250 may replace the virtual appliance 215/in-memory database 220 shown in FIG. 1. The in-memory application server 255, as illustrated, includes the in-memory database 220 (including, for example, the in-memory business logic 225, not shown here). The in-memory application server 255, as illustrated, also includes the server enterprise workspace 216, the business intelligence module 217, and the open source module 218.

The illustrated business financial management module 260, generally, supports IT services costing, customer value analysis, cost to serve, bill of material costing, and activity based costing, among other financial metrics. In some implementations, for example, the business financial management module 260 may provide for user-friendly, rapid, and efficient model building; accurate calculation and cross-charge for IT and other shared services; monitoring and manage costs, pricing, and true profitability; accurate assignment of overheads and indirect costs to customers, products, and channels; access to cost and profitability data by customer, product, or business channel; accurate assignment, monitoring, and analysis of overhead costs tied to bill of materials, among other functions.

Figure 3B:
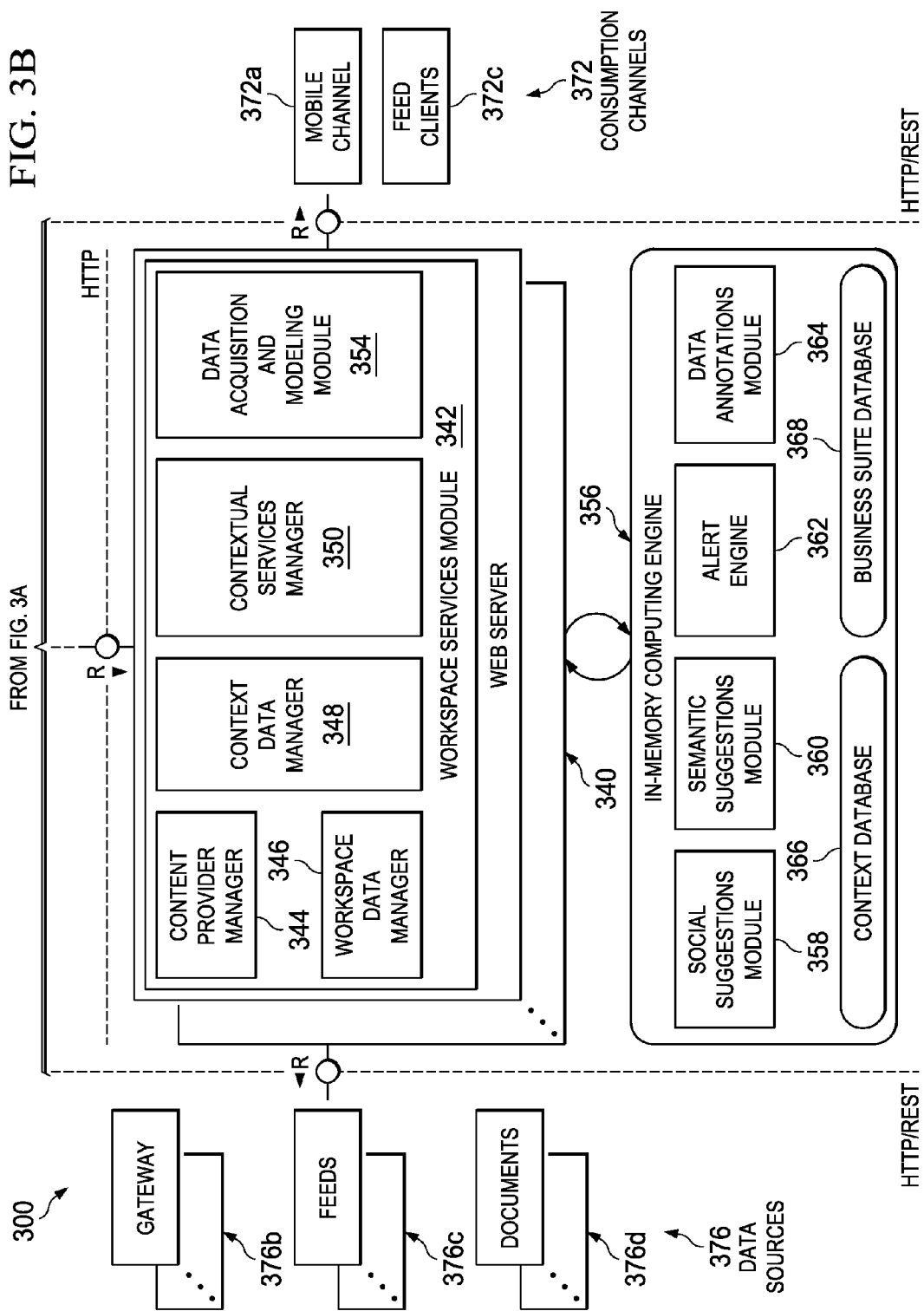
FIG. 3 illustrates an example virtual distributed computing system operable to generate, view, modify, and/or otherwise manipulate a contextual workspace.

FIG. 3 illustrates an example virtual distributed computing architecture 300 operable to generate, view, modify, and/or otherwise manipulate a contextual workspace. In some implementations, the example virtual distributed computing architecture 300 is also operable to enrich a user interface presented in the contextual workspace by generating graphical representation of relationships between data cubes or data objects that were not previously defined in existing data cubes, and generating new data cubes at runtime based on user exploration of the graphical representations. As illustrated, the virtual distributed computing architecture 300 includes a web client 302, a web server 340, an in-memory computing engine 356, one or more external services 370, one or more consumption channels 372, one or more external content providers 374, and one or more data sources 376. As further illustrated, the web client 302, the web server 340, the in-memory computing engine 356, the one or more external services 370, the one or more consumption channels 372, the one or more external content providers 374, and/or the one or more data sources 376 may be communicably coupled through an HTTP and/or REST architecture.

The illustrated web client 302 includes a UI module 304, a connectivity module 306, and a context module 308. The illustrated UI module 304, in some embodiments, may generate, modify, and/or maintain a virtual contextual workspace and present the workspace to a user through a GUI. The UI module 304 includes a workspace manager 310, a module gallery 312, a layout manager 314, a data orchestrator 316, a contextual assistance module 318, a global filtering module 322, a data streaming module 324, and a timeline module 326. The illustrated workspace manager 310, in some embodiments, may include functionality that manages operation and use of the contextual workspace by the user.

The illustrated module gallery 312, in some embodiments, may keep track of one or more workspace modules (such as the workspace modules shown in FIGS. 4A-4C) viewable on and/or available to a contextual workspace presented to the user. For example, the module gallery 312 may include an index (e.g., stored in a repository) of the current workspace modules being viewed by the user in the contextual workspace.

The illustrated layout manager 314, in some embodiments, may determine how one or more selected and/or requested workspace modules may be arranged on the contextual workspace. For example, the layout manager 314 may determine a size and/or placement of each module on the contextual workspace in order to, for instance, better manage the contextual workspace in the GUI presented to the user.

The illustrated data orchestrator 316, in some embodiments, may determine, for example, one or more available views and/or functionality available to the user with respect to a data cube (e.g., an OLAP cube storing business data exposable to the user). For example, the data orchestrator 316 may determine how to present or show any data model, including a data cube, to the user (e.g., icon, full screen, or something in between). In some embodiments, for example, the data orchestrator 316 may function along with other components of the illustrated architecture (e.g., the workspace manager 310, the module gallery 312, the layout manager 314, and other components) to perform the functionality described in FIGS. 4A-D and 5, as well as other processes and methods described herein.

The illustrated contextual assistance module 318, in some embodiments, may include functionality that provides the user of the contextual workspace generated by the architecture 300 with additional business data contextually relevant with business data being currently viewed in the workspace. For instance, the contextual assistance module 318 (or other modules included in the illustrated architecture 300) may identify semantically related information to that currently viewed on the contextual workspace by the user. The semantically related information may be suggested to the user, for example, to add to the contextual workspace through one or more workspace modules.

The illustrated global filtering module 320, in some embodiments, may provide for functionality that, for example, ranks and/or filters various suggestions for content (e.g., semantically related content or socially related content) to be added to the user's contextual workspace through architecture 300. For instance, the global filtering module 320 (or other modules included in the illustrated architecture 300) may rank suggestions to add semantically related data to the user's contextual workspace according to one or more social metrics.

The illustrated data annotations module 322, in some embodiments, may provide for functionality that, for example, allows a user to generate notes (or other annotations) that provide specific context to data within one or more workspace modules in the contextual workspace. For instance the data annotations module 322 may, in some aspects, allow the user to dynamically create and/or view insights (e.g., notes or other annotations) on contexts of data within the contextual workspace. The insights could be for the user or other users (e.g., a collaboration).

The illustrated data streaming module 324, in some embodiments, may manage, direct, and/or control the transfer of data (e.g., from data objects, data cubes, documents, reports, feeds, and other data sources) to, for example, the web client 302. For instance, the data streaming module 324 may manage the speed at which data is transferred to the web client 302 to, for example, expose on one or more workspace modules of the contextual workspace generated and presented to the user.

The illustrated timeline module 326, in some embodiments, may provide for functionality that allows a user to "time travel" through one or more previous views of a contextual workspace. For instance, in some embodiments, each distinct contextual workspace (i.e., each view with a distinct set, combination, and/or number of workspace modules included within the contextual workspace) may be time stamped with a particular time (e.g., hour/minute/day, date, week, month, or other granularity). The time stamp may be part of the metadata of the contextual workspace generated by and presented to the user. In some aspects, the user may "time travel" back in time to view previous versions of the contextual workspace according to the time stamp. Thus, not only the data contained in the contextual workspace, but the user's subjective view on the data (e.g., which workspace modules were selected) can be retrieved. The user may filter the contextual workspace versions by the time stamp, data exposed in the contextual workspaces, keywords, and/or other metrics.

The illustrated connectivity module 306 includes, in some embodiments, context sources module 328 and a content fetching module 330, and, in some aspects, may provide connection functionality for the web client 302 to communicate with, for example, the web server 340, the in-memory computing engine 356, the data sources 376, and/or other content repositories or sources. The illustrated context sources module 328, in some embodiments, may provide for functionality to the web client 302 to connect to various sources of contextually relevant (e.g., semantically relevant) data related to one or more workspace modules in the contextual workspace. For example, semantically relevant data may be exposed from, for example, data objects, data cubes, documents, search functions, social data (e.g., people), and other sources.

The illustrated content fetching module 330, in some embodiments, may provide functionality to retrieve and/or gather data content from one or more data sources, such as, for example, data objects, data cubes, documents, search functions, social data (e.g., people), and other sources.

The illustrated context module 308 includes, in some embodiments, a context discovery module 332, a suggestions and rankings module 334, an events and alerts module 336, and a context model 338. In some aspects, the context module 308 may provide functionality related to discovering and/or suggesting semantically relevant data (e.g., from data objects, data cubes, and otherwise) related to data being viewed by the user on the contextual workspace. The illustrated context discovery module 332, in some embodiments, may provide functionality related to searching for and/or exposing semantically relevant content related to data on the contextual workspace, e.g., in one or more workspace modules. For example, semantically relevant data may include information related to data that the user works with or views in the contextual workspace and/or arranges (according to his/her expertise) within the contextual workspace. For instance, the arrangement of data (e.g., which workspace modules are selected and/or viewed) may provide at least a portion of the overall context of the workspace apart from the data (numerical or otherwise). The semantically relevant data may be related, e.g., according to keywords, metadata, cube dimensions, cube measures, cube views, table headings, etc., which may be unknown to the user (due to, for instance, the vast amount of data available to the user).

The illustrated suggestions and rankings module 334, in some embodiments, may include functionality that provides suggestions of semantically relevant data to the user to add to the contextual workspace. The suggestions and rankings module 334 may also include functionality that ranks a number of suggestions of semantically relevant data according to, for example, matching keywords, matching metadata, social metrics, and/or other criteria.

The illustrated events and alerts module 336, in some embodiments, may include functionality that allows the user set an alert, e.g., at a given point of time when a particular event is occurring. The user, therefore, may be reminded (at a later time) of how that particular problem was resolved. In some aspects, the events and alerts module 336 may also provide a user with notification (via one or more workspace modules of the contextual workspace) of events and/or alerts based on, for instance, actions of other users with similar roles within the business enterprise (e.g., within the same organization unit, or having the same title).

The illustrated context model 338, in some embodiments, may build and/or generate a model (e.g., a context bag) containing the discovered semantically relevant data related to the contextual workspace data exposed in one or more workspace modules.

The illustrated web server 340 includes a workspace services module 342. The illustrated workspace services module 342 includes a content provider manager 344, a workspace data manager 346, a context data manager 348, a contextual services manager 350, and a data acquisition and modeling module 354. The illustrated content provider manager 344 and the illustrated workspace data manager 346, in some embodiments, may direct, control, and/or otherwise manage the content and data exposed on the one or more workspace modules in the contextual workspace.

The illustrated context data manager 348, in some embodiments, may direct, control, and/or otherwise manage semantically relevant content (e.g., determined according to, for example, metadata contained in the workspace modules on the contextual workspace). In some embodiments, the illustrated contextual services manager 350 may include functionality that assists (at least partially) the context data manager 348 in directing, controlling, and/or otherwise managing semantically relevant.

The illustrated data acquisition and modeling module 354, in some embodiments, may perform modeling functionality on business data to be exposed in one or more workspace modules in the contextual workspace. For instance, the data acquisition and modeling module 354 may model data objects, such as data cubes, as three-dimensional workspace modules in the contextual workspace. In some implementations, the data acquisition and modeling module 354 may render three-dimensional graphical views on data cubes and other data objects to allow graphical exploration of business data in an in-memory database, as described below in relation to FIGS. 4A-4D and FIG. 5.

The illustrated in-memory computing engine 356 includes a social suggestions module 358, a semantic suggestions module 360, an alert engine 362, a data annotations module 364, a context database 366, and a business suite database 368. In some embodiments, the social suggestions module 358 may, in some embodiments, include functionality that provides suggestions of socially relevant data to the user to add to the contextual workspace. For instance, the suggestions may include business data that other users (e.g., other business users in the same organizational unit of the enterprise, same team of the user, or same role of the user, to name a few) found relevant and/or useful. The suggested business data may also be contextually relevant to one or more workspace modules active in the user's contextual workspace.

The illustrated semantic suggestions module 360, in some embodiments, include functionality that provides suggestions of semantically relevant data to the user to add to the contextual workspace. For instance, the suggestions may include business data that has some related contextual similarity with data exposed in one or more workspace modules in the user's contextual workspace. For example, the semantically relevant data may be business data from a data cube having one or more similar dimensions and/or measures as compared to a data cube currently being viewed and/or analyzed in the contextual workspace. As another example, the semantically relevant data may be business data from a table having a similar heading to a table currently being viewed in the contextual workspace. Thus, the suggested semantically relevant data may be business data that provides insight to the user that the business user would not have known about otherwise.

The illustrated alert engine 362, in some embodiments, in some embodiments, may include functionality that allows the user set an alert, e.g., at a given point of time when a particular event is occurring. The user, therefore, may be reminded (at a later time) of how that particular problem was resolved. In some aspects, the alert engine 362 may also provide a user with notification (via one or more workspace modules of the contextual workspace) of alerts based on, for instance, actions of other users with similar roles within the business enterprise (e.g., within the same organization unit, or having the same title).

The illustrated data annotations module 364, in some embodiments, may provide for functionality that, for example, allows a user to generate notes (or other annotations) that provide specific context to data within one or more workspace modules in the contextual workspace. For instance the data annotations module 364 may, in some aspects, allow the user to dynamically create and/or view insights (e.g., notes or other annotations) on contexts of data within the contextual workspace. The insights could be for the user or other users (e.g., a collaboration).

The illustrated context database 366, in some embodiments, may store and/or reference one or more contextually relevant data objects, such as data objects that have been determined (e.g., by one or more components of the architecture 300 such as the social suggestions module 358, the semantic suggestions module 360, or other component) to be socially and/or semantically relevant based on one or more workspace modules in the contextual workspace. For example, the context database 366 may store and/or reference one or more data cubes, reports, documents, business objects, or other data objects. In some embodiments, the context database 366 may also store and/or reference one or more suggestions (e.g., social, semantic, or otherwise) generated by the architecture 300.

The illustrated business suite database 368, in some embodiments, may store and/or reference business data, such as business data utilized by the business suite app 374a.

The illustrated external services 370 include an event insight 370a, social intelligence 370b, text analysis 370c, and feed services 370d. Generally, the illustrated external services 370 may provide business data (e.g., semantically and/or socially relevant business data) to at least one of the web client 302, the web server 340, and/or in-memory computing engine 356. For instance, the illustrated event insight 370a, in some embodiments, may provide alerts to the web client 302 and/or web server 340 to present to the business user through one or more workspace modules of the contextual workspace. The illustrated social intelligence 370b, in some embodiments, may provide social business data (e.g., social connections between one or more business users in a business enterprise) to the web client 302 and/or web server 340 to present to the business user through one or more workspace modules of the contextual workspace. For example, the social business data may be a graph and/or chart showing business connections between employees, such as, for instance, a degree of connection between the employees (e.g., through one or more known business contacts). The illustrated text analysis 370c, in some embodiments, may identify business data located in documents or other data objects through, for instance, a keyword search or metadata search of the text in the documents. The illustrated feed services 370d, in some embodiments, may provide business data through one or more web feeds to the web client 302 and/or web server 340 (e.g., RSS feeds).

The illustrated consumption channels 372 include a mobile channel 372a and one or more feed clients 372c. Typically, the consumption channels 372 may also provide business data (e.g., semantically and/or socially relevant business data) to at least one of the web client 302, the web server 340, and/or in-memory computing engine 356. For instance, the illustrated mobile channel 372a, in some embodiments, may provide business to the web client 302 and/or web server 340 from one or more mobile channels to present to the business user through one or more workspace modules of the contextual workspace.

The illustrated feed clients 372c, in some embodiments, may include, for example, a mail client, which may provide business data to at least one of the web client 302, the web server 340, and/or in-memory computing engine 356 through one or more electronic communications.

The illustrated external content providers 374 include one or more UI applications, such as a business suite app 374a, a business intelligence app 374b, and a social gadget app 374c. Typically, the external content providers 374 provide for a number of UI applications that may be interfaced by a user, e.g., through the web client 302 or otherwise. The business suite app 374a, for example, may be business applications that provide integration of information and processes, collaboration, industry-specific functionality, and scalability. For instance, the business suite app 374a may include one or more constituents, such as CRM (Customer Relationship Management), ERP (Enterprise Resource Planning), PLM (Product Lifecycle Management), SCM (Supply Chain Management), and/or SRM (Supplier Relationship Management). The business intelligence app 374b, for example, may provide for a UI application that may be used in identifying and extracting business data (e.g., ETL) and analyzing such business data. The business data may include, for example, sales revenue, profits, and/or costs broken down by products and/or departments. In some aspects, the business intelligence app 374b may provide for historical, current, and/or predictive views of business operations, such as reporting, online analytical processing, analytics, data mining, process mining, business performance management, benchmarking, text mining, and/or predictive analytics. In some aspects, the business intelligence app 374b may also provide for layers including an ETL layer (e.g., responsible for extracting data from a specific source, applying transformation rules, and loading it into a data warehouse); the data warehouse (e.g., responsible for storing the information in various types of structures); reporting (e.g., responsible for accessing the information in the data warehouse and presenting it in a user-friendly manner to the business user); and a planning and analysis layer (e.g., provides capabilities for the user to run simulations and perform tasks such as budget calculations). The illustrated social gadget app 374c, for example, may include games, social news feeds and other UI apps.

The illustrated data sources 376 include an in-memory database 376a, a gateway 376b, one or more feeds 376c, and one or more documents 376d. Typically, the data sources 376 may provide data, such as business data, to the illustrated web client 302 and/or web server 340 that may be manipulated to, for instance, provide suggestions of additional contextual data, provide suggestions of semantically-related data, and/or provide other suggestions, alerts, or events. For example, the in-memory database 376a may store and/or reference one or more data cubes containing business data. The gateway 376b may, for example, be a front-end server to the business suite app 374 and expose business suite services in an open protocol format. The feeds 376c, for instance, may provide business and/or social data through social updates, for example, Twitter, Facebook, RSS feed/channels, and/or other feed sources or channels. The documents 376d, for instance, may be any number of documents stored in or referenced by a document store (i.e., in a relational database or otherwise).

Figure 4A:
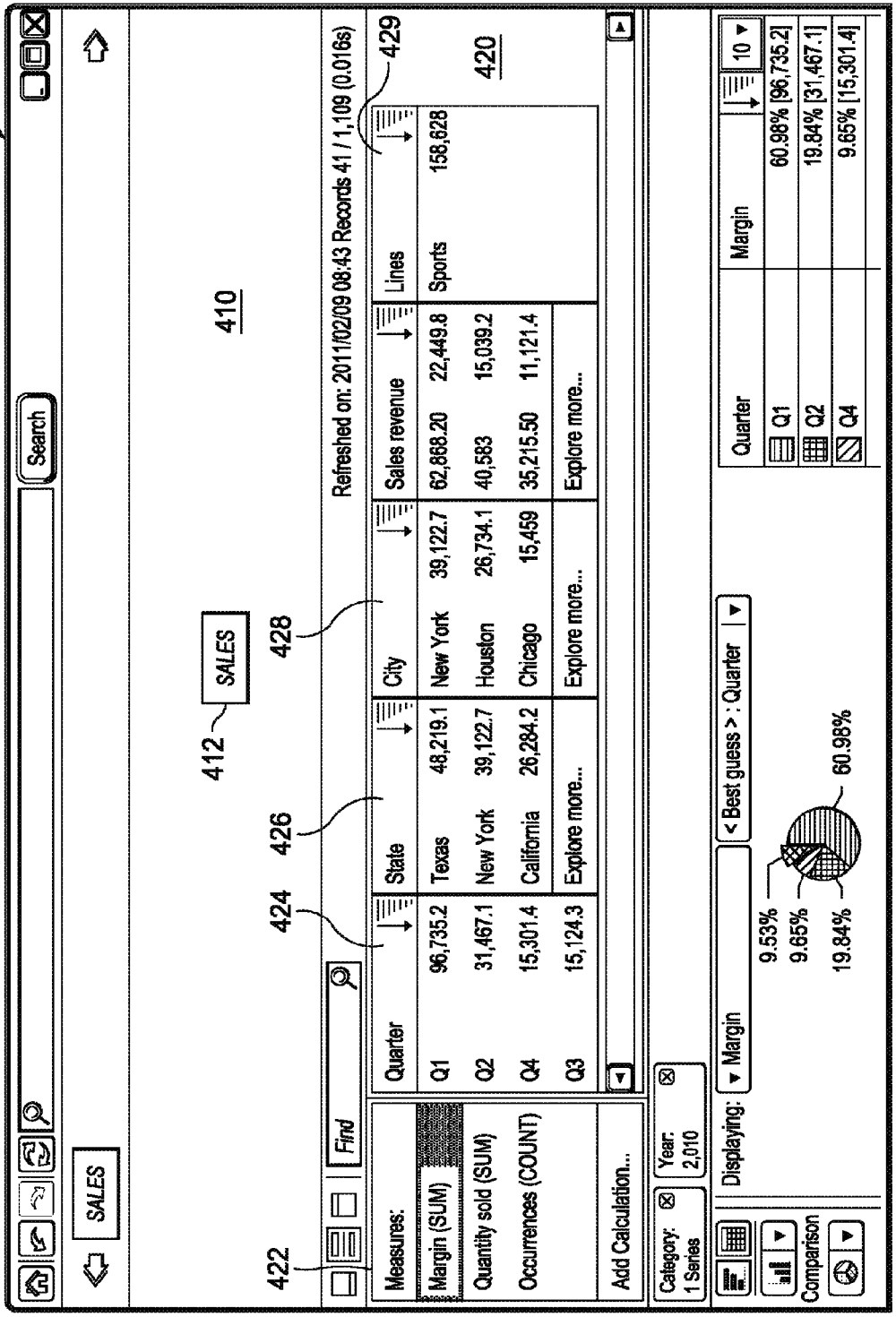
FIGS. 4A-4D illustrate example screenshots of providing graphical exploration of an in-memory database.

FIGS. 4A-4D illustrate example screenshots 400a, 400b, 400c, and 400d, of an application providing graphical exploration of data objects in an in-memory database. Turning to FIG. 4A, an existing data cube is illustrated. The data cube may be presented in a contextual workspace, for example. In an initial stage, a user is provided access to predefined data cubes. The user is presented with data in a particular view as defined by the predefined data cubes, allowing the user to interact with (e.g., select, modify, slice, dice, pivot, or otherwise) a particular measure, dimension, and/or view of the data cube. The interaction by the user may be an interaction with at least some of the data contained in the data cube exposed in one or more workspace modules within the contextual workspace. For example, as depicted in FIG. 4A, a visual representation of a sales data cube 412 is presented in the upper half 410 of the screen shot 400a and an analysis tool 420 is presented in the lower half. The sales data cube 412 is already modeled using certain measures and dimensions in a predefined manner. The analysis tool 420 depicts classical point-of-sales data in the view provided by the sales data cube 412. For example, the point-of-sales data can include revenue sales data arranged by quarter 424, state 426, city 428, or lines of sales 429. In some implementations, classical point-of-sales data can include a view of sales organized by margin, quantity sold, or number of occurrences, as illustrated in the "Measures" window 422 in FIG. 4A.

In certain instances, however, a user may need to query the in-memory database for data objects or views that may not match the predefined data cubes. The user may be limited, at least to some extent, to exploration of the predefined sales data cube and not be able to view non-classical point-of-sales data in the view provided by the sales data cube. For example, classical point-of-sales data may not include a view of sales data based on marital status of the buyer or employee. Accordingly, a user is not able to analyze sales data in terms of marital status given only the view presented in the predefined sales data cube 412.

Figure 4B:
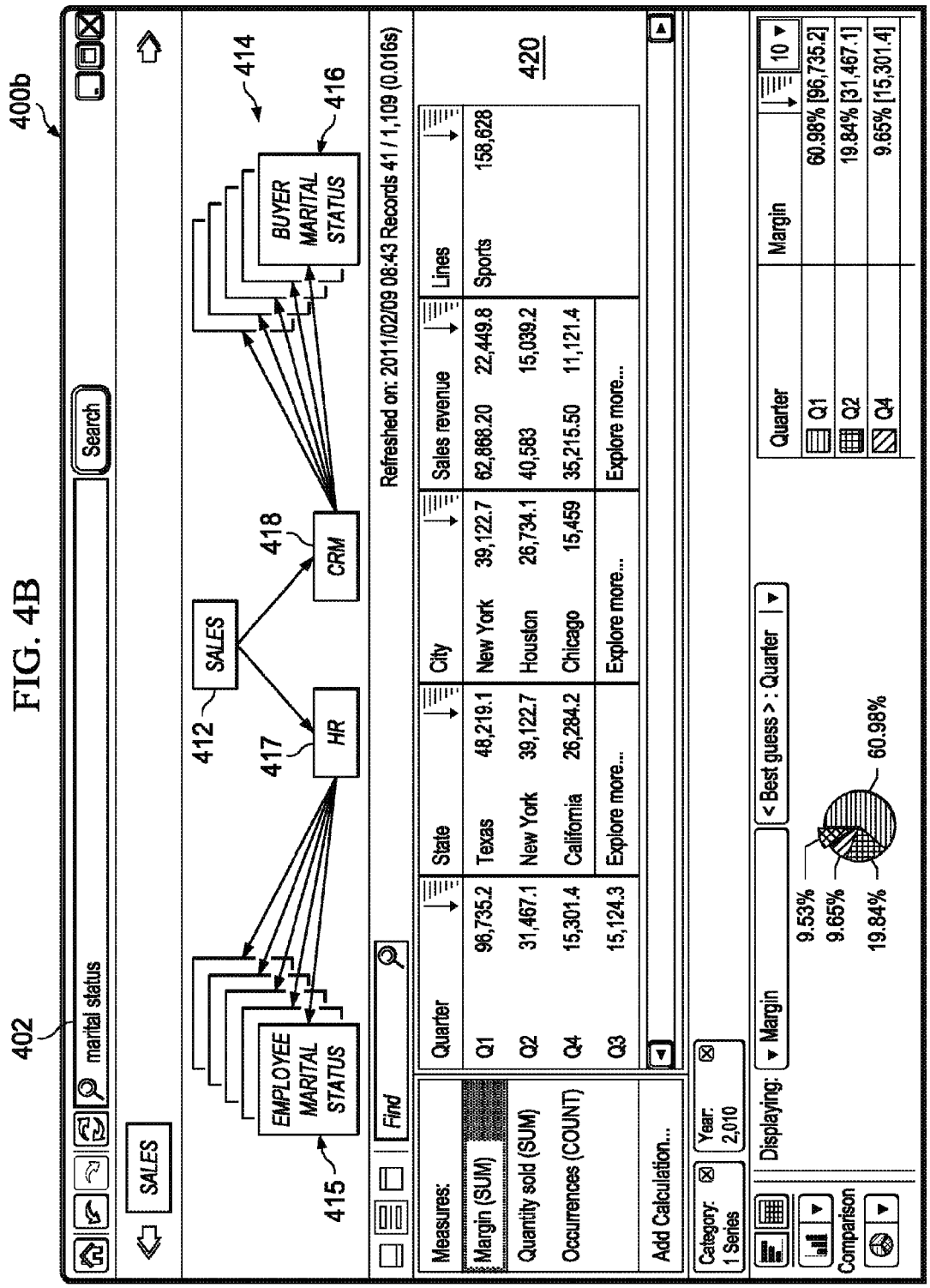

FIG. 4B depicts a screenshot 400b of a data graph 414 generated in response to a query for a particular search term 402. A query can be executed for a search term 402 to obtain relevant data connected to the current data cube 412. In the illustrated example, if a user desires to check a non-classical point-of-sales data category, such as marital status, the user can search for the term "marital status" 402 in a search field. In some implementations, a drag-and-drop operation can be performed to initiate a search based on a suggested measure in the current data cube. The search term 402 may not be associated with data currently displayed in connection with the current data cube 412. The query is executed across the in-memory database while searching dimensions and measures of existing data objects. The search may not be limited to a full text search and can include semantic searches.

In certain instances, the search results include or are associated with other data cubes 417 and 418 that are responsive to the search term 402. The search results can be one or more data objects 415 and 416 that are not included in the initial, predefined data cube. The data objects 415 and 416 returned from the search may be represented as nodes in the data graph 414 displayed in the application. In some instances, the data objects 415 and 416 are also associated with different data cubes 417 and 418. As seen in FIG. 4B, a visual representation of the data cubes 417 and 418 associated with the responsive search results can be displayed, along with a graphical relation of the original data cube, the sales data cube 412 in the present example, to the data cubes 417 and 418 returned from the search. The search for "marital status" can return results associated with an employee marital status 415 and a buyer marital status 416, for example. The paths from the sales data cube 412, and any related or intervening nodes, can be traced from the search results back to the initial data cube 412 and displayed to the user. In some implementations, the shortest path between the sales data cube 412 and the nodes associated with the search results is determined. Accordingly, the user can browse the displayed graph and explore new paths to different data cubes. In the illustrated example, a connecting node can include a human resources data cube 417 between the sales data cube 412 and the employee marital status data objects 415, and a customer relationship management (CRM) data cube 418 between the sales data cube 412 and the buyer marital status data objects 416. The user can then easily navigate the various nodes and data cubes associated with the marital status query.

Figure 4C:
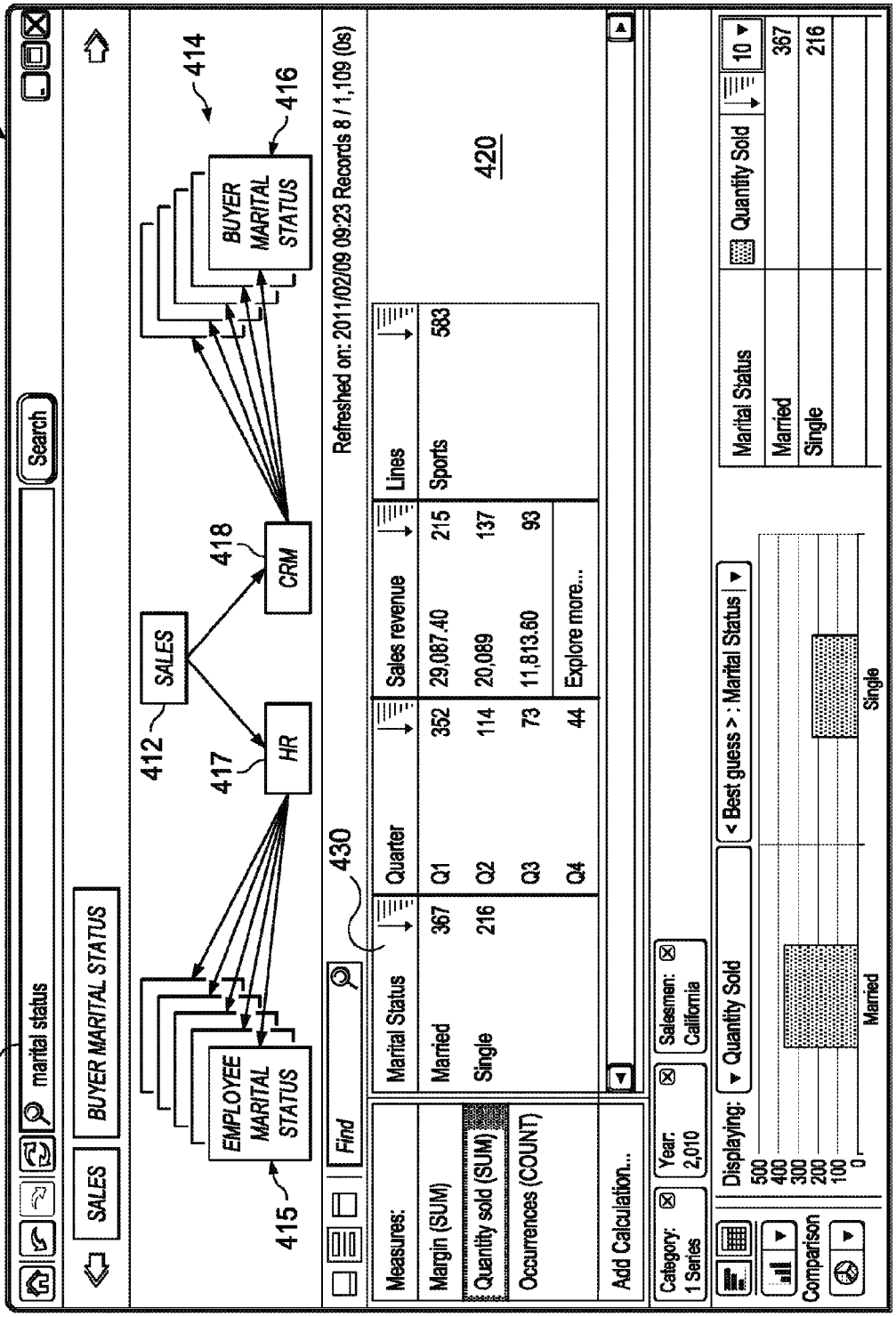

FIG. 4C illustrates a screenshot 400c depicting a user's selection of a particular node associated with a data cube different from the initial sales data cube 412. In the present example, the buyer marital status data objects 416, illustrated as nodes in the data graph 414, associated with the CRM data cube 418 are selected by the user. In response to selection of the buyer marital status data objects 416, a new data cube is generated that includes at least a dimension depicting a relationship of the buyer marital status data objects 416 and other sales data.

For example, turning briefly to FIG. 6, an example algorithm 600 for calculating a new data cube based on a predefined dimension. Algorithm 600 may be implemented, for instance, to generate a new data cube that includes at least a dimension depicting a relationship of the buyer marital status data objects 416 and other sales data. In the example algorithm 600, "X" is given as a data cube selected from search results on a plurality of data cubes for a particular dimension "x'" shown in the algorithm 600. Further, in algorithm 600, "A" is given as an "entry point" data cube (e.g., a data cube that a user investigates and desires to enrich with x'). In other words, A is the data cube to be generated that includes the particular dimension x'. The resultant execution of algorithm 600 generates the entry point data cube, A, with one or more assumptions. For example, it is assumed that the shortest path from X to A is given as a graph having vertices that represent a plurality of data cubes and edges represent relationships between the data cubes. Further, the algorithm 600 follows a contiguous path in the graph from X to A (e.g., the algorithm asks a vertex in the graph about its next edge, and asks an edge about the next vertices in the path leading from X to A).

Returning to FIG. 4C, the analysis tool 420 automatically regenerates the presented view based on the data from the new data cube. In the illustrated example, sales revenue is arranged based on marital status, as indicated in the "Marital Status" window 430 of the analysis tool 420.

Figure 4D:
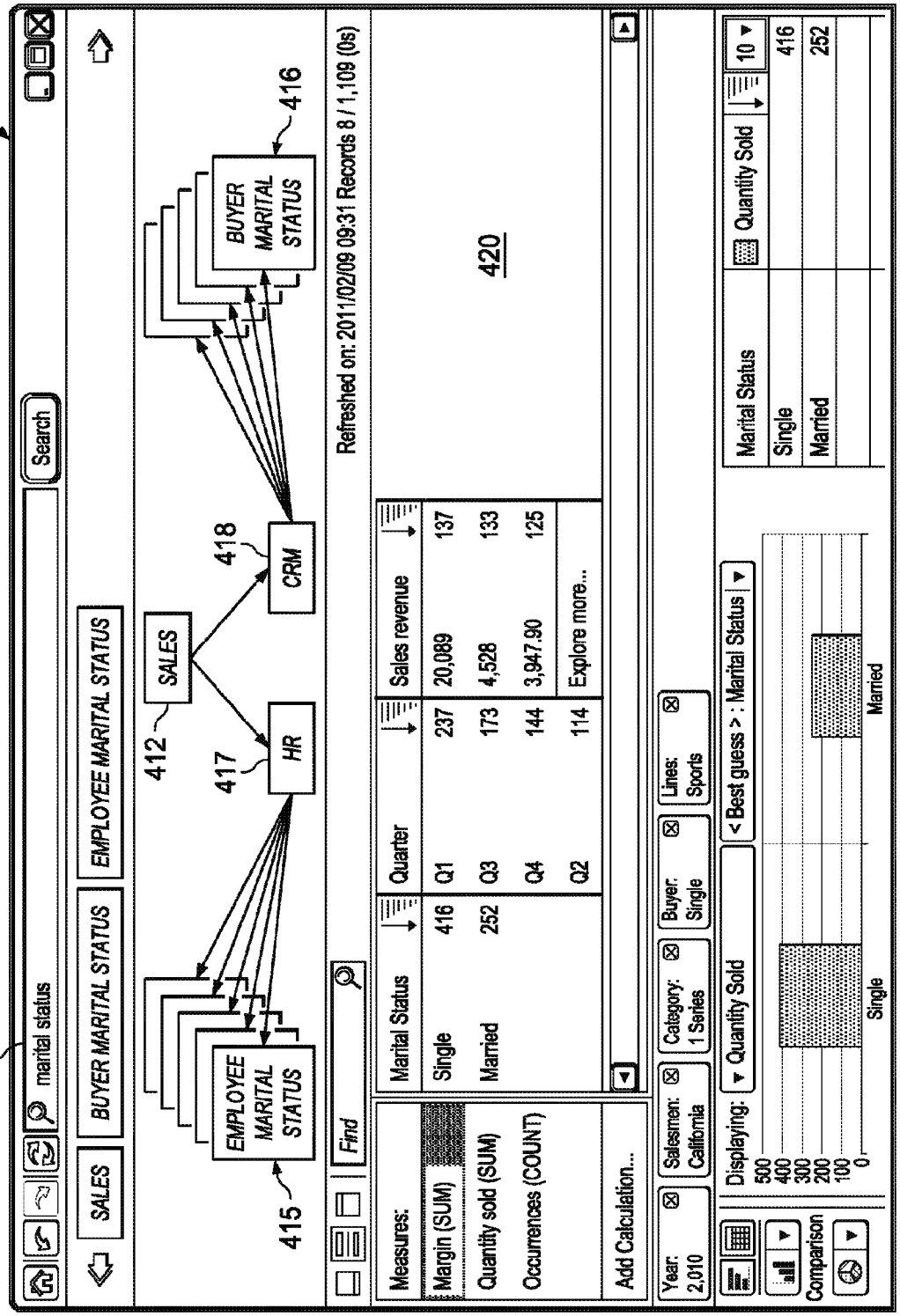

FIG. 4D illustrates a screenshot 400*d* of selection of another dimension from the search results in addition to the previously selected dimensions. Here, the user has selected employee marital status data objects 415 from the presented graphical paths in FIG. 4D. Based on the selection, another new data cube can be generated that includes sales data in relation to employee marital status. The view presented in the analysis tool 420 is also updated to reflect user selection of the newly generated data cube. Accordingly, certain data objects responsive to the user's queries, and the relationships between the data objects and an initial data cube, can be represented graphically as paths connected to the initial data cube. New data cubes that include views of data not found in previously defined data cubes can then be generated in real-time based on user analysis of the graphical paths and selection of certain nodes in the paths.

In some implementations, a learning mechanism can be used to incorporate commonly used search terms into standard data cubes. For example, as a particular search term increases in use by one or more users, the search term or the results associated with querying the in-memory database with the search term can be used to define additional data cubes. New data cubes can be automatically defined to include views of commonly analyzed categories of data. Further, commonly analyzed data cubes, views, or search terms may be presented as semantic or social suggestions to a user in certain contexts. In certain instances, a user may be viewing a particular data cube and is presented with suggestions for additional views on the underlying business data. The suggestions may be based on search terms that have been frequently used to identify additional views when other users have viewed the same data cube, even if the suggested views are not directly connected to that data cube.

Figure 5:
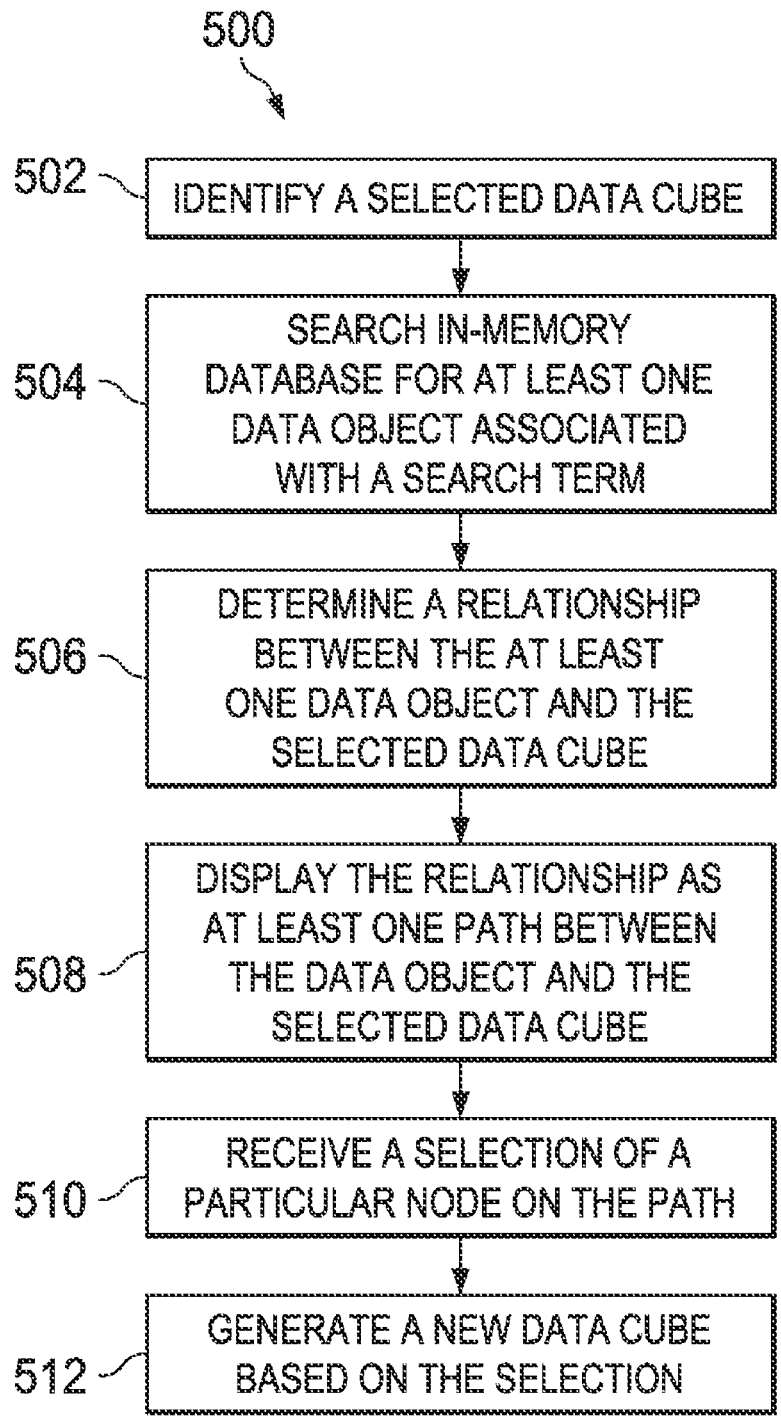
FIG. 5 illustrates an example method for providing graphical exploration of an in-memory database.

FIG. 5 illustrates an example process 500 for providing graphical exploration of an in-memory database. First, a selected data cube is identified at 502. The data cube may be identified via receiving a selection from a user. For example, a user may need a particular view on business data and choose the particular view from a plurality of different, predefined data cubes. In some instances, the available, predefined data cubes or the selected data cube may not capture certain elements or non-classical dimensions that the user would like to analyze. Accordingly, the user can enter a search term to identify data objects or relationships between data objects that the user may want to analyze that are not currently represented in a predefined data cube. The in-memory database is searched for at least one data object associated with the search term at 504.

A relationship between the at least one data object and the selected data cube is determined at 506. In some instances, the relationship can be represented as a path from the selected data cube to the data object. For example, the data object may be associated with a different data cube, and the different data cube can be traced back to the selected data cube directly or through other intervening data cubes, nodes, or data objects. Further, multiple data objects can be identified from the search of the in-memory database. Each of the data objects may be related to the selected data cube along a different path or along the same path as other data objects.

The relationship is displayed as at least one path between the data object and the selected data cube at 508. The displayed path can include a display of each node or data cube needed to display the connection between the data object and the selected data cube. Accordingly, a user is presented with a graphical depiction of relationships between an initial view on business data and other data objects in an in-memory database that the user has searched for. The user can explore relationships within the in-memory database through the graphical representation to identify other dimensions to include in a new data cube. In some implementations, the user can select a particular node in the graphical representation. Accordingly, a selection of a particular node on the displayed path is received at 510.

The user's selection indicates a particular attribute or dimension that will be used to generate a new data cube separate from the selected data cube and other predefined data cubes. In response to the user's selection, a new data cube is generated based on the selection at 512. The new data cube represents a new view on the underlying business data that includes features that the user desires to explore and analyze that may not be found in any predefined data cube. Further, the search for relevant data objects is performed on business data in the in-memory database. Accordingly, generation of the new data cube can be performed in real-time as the user interacts with data cubes at runtime.

A number of implementations have been described. Nevertheless, it will be understood that various modifications may be made. For example, other methods described herein besides those or in addition to those illustrated in FIG. 5 may be performed. Further, the illustrated steps of method 500 may be performed in a different order, either concurrently or serially. Further, steps may be performed in addition to those illustrated in method 500, and some steps illustrated in method 500 may be omitted without deviating from the present disclosure. Further, algorithm 600 represents one example algorithm for calculating a new data cube based on a predefined dimension and other algorithms may be used without departing from the scope of this disclosure or claims. Accordingly, other implementations are within the scope of the following claims.

What is claimed is:

1. A computer-implemented method performed with a computing system for graphically exploring an in-memory database, the method comprising:

receiving a selection of a first data object by a user, the first data object including a plurality of data elements;

identifying a particular data element for interaction by the user;

determining that the particular data element is exclusive of the plurality of data elements of the first data object;

in response to the determining, searching an in-memory database for the particular data element, the in-memory database storing the first data object and a second data object;

determining that the particular data element is inclusive of the second data object;

determining a first relationship between the first data object and the second data object, and a second relationship between the second data object and the data element; and generating a displayable graph of the first and the second relationships as a path between the particular data element and the first data object, the path comprising at least three nodes, where a first node represents the first data object, a second node represents the particular data element, and a third node represents the second data object.

2. The computer-implemented method of claim 1, further comprising:
receiving a selection of a particular node on the path; and
generating a new data object based on the selection.

3. The computer-implemented method of claim 2, wherein the new data object includes a view of data in the in-memory database different from a view associated with the first data object.

4. The computer-implemented method of claim 2, wherein the new data object includes the particular node on the path.

5. The computer-implemented method of claim 1, wherein searching the in-memory database for the particular data element further comprises:
searching the in-memory database for a search term associated with the particular data element,
identifying, in response to searching the in-memory database a plurality of data objects associated with the search term.

6. The computer-implemented method of claim 5, wherein a plurality of relationships are determined between the first data object and the plurality of data objects, wherein each of the plurality of relationships is displayed in at least one of a plurality of paths, each of the plurality of paths sharing the first data object as a common node.

7. The computer-implemented method of claim 5, wherein the search term is not associated with a dimension of the first data object.

8. The computer-implemented method of claim 1, wherein the third node is an intervening node between the first and second nodes.

9. The computer-implemented method of claim 1, wherein the first data object is a data cube.

10. The computer-implemented method of claim 1, wherein determining that the particular data element is associated with the second data object further comprises determining that the particular data element is only associated with the second data object.

11. An apparatus comprising instructions embodied on a tangible, non-transitory computer-readable media, the instructions operable when executed to cause a computing system to perform operations comprising:
receiving a selection of a first data object by a user, the first data object including a plurality of data elements;
identifying a particular data element for interaction by the user;
determining that the particular data element is exclusive of the plurality of data elements of the first data object;
in response to the determining, searching an in-memory database for the particular data element, the in-memory database storing the first data object and a second data object;
determining that the particular data element is inclusive of the second data object;
determining a first relationship between the first data object and the second data object, and a second relationship between the second data object and the data element; and
displaying the first and the second relationships as a path between the particular data element and the first data object, the path including at least three nodes, wherein a first node represents the first data object, a second node represents the particular data element, and a third node represents the second data object.

12. The apparatus of claim 11, wherein the operations further comprise:
receiving a selection of a particular node on the path; and
generating a new data object based on the selection.

13. The apparatus of claim 12, wherein the new data object includes a view of data in the in-memory database different from a view associated with the first data object.

14. The apparatus of claim 12, wherein the new data object includes the particular node on the path.

15. The apparatus of claim 11, wherein searching the in-memory database for the particular data element further comprises:
searching the in-memory database for a search term associated with the particular data element,
identifying, in response to searching the in-memory database, a plurality of data objects associated with the search term.

16. The apparatus of claim 15, wherein a plurality of relationships are determined between the first data object and the plurality of data objects, wherein each of the plurality of relationships is displayed in at least one of a plurality of paths, each of the plurality of paths sharing the first data object as a common node.

17. The apparatus of claim 15, wherein the search term is not associated with a dimension of the first data object.

18. The apparatus of claim 11, wherein the third node comprises an intervening node between the first and second nodes.

19. A computing system, comprising one or more memory modules, one or more processors, and instructions stored on one or more of the memory modules and operable when executed with the one or more processors to perform operations comprising:
receiving a selection of a first data object by a user, the first data object including a plurality of data elements;
identifying a particular data element for interaction by the user;
determining that the particular data element is exclusive of the plurality of data elements of the first data object;
in response to the determining, searching an in-memory database for the particular data element, the in-memory database storing the first data object and a second data object;
determining that the particular data element is inclusive of the second data object;
determining a first relationship between the first data object and the second data object, and a second relationship between the second data object and the data element; and
generating a displayable graph of the first and the second relationships as a path between the particular data element and the first data object, the path comprising at least three nodes, where a first node represents the first data object, a second node represents the particular data element, and a third node represents the second data object.

20. The computing system of claim 19, wherein the operations further comprise:
receiving a selection of a particular node on the path; and
generating a new data object based on the selection.

21. The computing system of claim 20, wherein the new data object includes a view of data in the in-memory database different from a view associated with the first data object.

22. The computing system of claim 20, wherein the new data object includes the particular node on the path.

23. The computing system of claim 19, wherein searching the in-memory database for the particular data element further comprises:
   searching the in-memory database for a search term associated with the particular data element; and
   identifying, in response to searching the in-memory database, a plurality of data objects associated with the search term.

24. The computing system of claim 23, wherein a plurality of relationships are determined between the first data object and the plurality of data objects, wherein each of the plurality of relationships is displayed in at least one of a plurality of paths, each of the plurality of paths sharing the first data object as a common node.

25. The computing system of claim 23, wherein the search term is not associated with a dimension of the first data object.

26. The computing system of claim 19, wherein the third node is an intervening node between the first and second nodes.

* * * * *